United States Patent [19]

Fourqurean

[11] Patent Number: 5,293,892
[45] Date of Patent: Mar. 15, 1994

[54] SOLAR POWERED INJECTION DEVICE AND METHOD

[76] Inventor: George E. Fourqurean, 1714 Cessna, Midland, Tex. 79705

[21] Appl. No.: 963,827

[22] Filed: Oct. 20, 1992

[51] Int. Cl.$^5$ ............................................. G05D 11/13
[52] U.S. Cl. .................................... 137/3; 137/101.19; 136/291
[58] Field of Search ............... 136/291; 137/3, 101.19, 137/101.21

[56] References Cited

U.S. PATENT DOCUMENTS

| | | | |
|---|---|---|---|
| 2,863,471 | 12/1958 | Thurman | 137/101.21 |
| 3,150,676 | 9/1964 | Robinson | 137/101.21 |
| 3,317,809 | 5/1967 | Bowers et al. | 136/291 X |
| 3,900,043 | 8/1975 | Bowen et al. | 137/101.21 |
| 4,246,929 | 1/1981 | McLoughlin et al. | 137/101.21 X |

OTHER PUBLICATIONS

Imamura et al, "470-KW Photovoltaic Power System For Saudi Arabia Villages", presented to 15th Intersociety Energy Conversion Engr. Conference, Aug. 1980.

Solarex, "Photovoltaic Water Pumping", Solarex Corp Brochure, Feb. 1979.

*Primary Examiner*—Stephen M. Hepperle
*Attorney, Agent, or Firm*—Crutsinger & Booth

[57] ABSTRACT

An apparatus and method for injecting a fluid such as a chemical corrosion inhibitor into a pipeline is provided. A solar panel is supported by a support structure in the vicinity of the pipeline location for converting solar energy to electrical current. The solar panel is electrically connected to an electrical storage battery through a voltage regulator that regulates the current generated by the solar panel to the battery for charging or recharging the battery. An electrically operable fluid pump is electrically connected to the battery through a selectively operable relay that controls electrical current from the battery. A fluid inlet of the pump can be connected to a reservoir of a fluid and a fluid outlet of the pump to a pipe. The relay can be selectively controlled to operate the pump, thereby pumping fluid from the reservoir into the pipe. In another aspect, the relay can be selectively preprogrammed with a central processing unit.

29 Claims, 2 Drawing Sheets

SOLAR POWERED INJECTION DEVICE AND METHOD

TECHNICAL FIELD

The apparatuses and methods of the present inventions relate to solar powered injection pump systems.

BACKGROUND OF THE INVENTION

The typical injection pump system has a tank or reservoir of the chemical to be injected into a system, a pump for injecting metered doses or a continuous flow of the chemical into the system, and a power source for the pump. For example, it is well known in the art to provide corrosion protection for pipelines by injecting an effective amount of a corrosion inhibitor into the fluid stream. Pipeline corrosion can cause enormous environmental and financial cost.

It is well known in the art to power these injection pumps with regular alternating current brought to the pump by conventional power lines. However, chemical injection pumps are often located in the field where electrical power is not readily available or oil or gas throughputs are such that bringing power to the field location is not economical.

In the past, some injection pumps have been operated by the gas pressure of a natural gas pipeline. However, these injection devices are not easily controlled. They are usually operated continuously, which results in the injection of excessive amounts of corrosion inhibitor. Needlessly operating the gas pump wastes the natural gas, which is vented to the atmosphere after using the work done by the pressure drop. A typical gas operated pump currently costs about 1,500 U.S. dollars (consumer value) in natural gas annually per injection pump. Furthermore, these gas operated pumps may soon be required to meet tough new government mandated regulations relating to environmental pollution that limit the emissions of volatile organic components (VOC) such as butane, propane, and methane (natural gas).

The need for corrosion protection is also important for downhole treatment of oil and gas wells. As an oil field or gas field is depleted, increasing amounts of water enters the field formations. The increasing proportions of water in the produced product causes more internal corrosion of downhole tubulars, pipelines, and storage tanks.

In some cases the injection pump is operated by the beam pump of the oil well. A beam operated injection pump is a lever-racket type system with a metal rod from the pump to the walking beam of the oil well pump jack. As the walking beam is moved up and down, the metal rod moves the lever on the injection pump. However, these systems can require substantial mechanical maintenance, there is no good way to control of the dosage of chemical injected, and they are prone to leak the chemical.

In a batch process for treating the downhole tubing called "truck treating," a truck is driven to each well location, an amount of chemical is pumped into the well, and the chemical is flushed downhole with water carried on the truck. This batch treatment is usually performed about one a week or so. Truck treating is expensive and time consuming to perform, and thus it is often not performed with sufficient frequency to protect the downhole tubing.

Because of the problems and expenses associated with the prior art injection systems, many pipelines and wells have not been provided any corrosion inhibitors. For example, the smaller gathering lines of many oil and gas fields are not provided with any corrosion inhibitor injection devices.

Thus, there is a long-felt need for a low cost, low maintenance, and simple system for injecting dosed amounts of fluids. There has also been a long-felt need for using an alternative energy source for powering the pump system for injecting the chemicals.

SUMMARY OF THE INVENTION

A solar powered injection device and method are provided. According to the present inventions, the injection device includes a solar panel, an electrical storage battery, and an electrically operated fluid pump.

The solar panel converts solar energy into electrical energy. A support structure supports the solar panel so that it can be oriented toward the sky and collect solar energy. Electrical energy produced by the solar panel is supplied to the electrical storage battery to maintain the charge on the battery. The battery is electrically connected to the fluid pump, which can draw a fluid from a storage tank and inject the chemical into a system, such as a pipeline.

The solar panel can be connected to the battery through a voltage regulator to provide a charging current from the solar panel to the battery when the voltage on the battery drops. The battery can be connected to the pump through a selectively operable relay to control the pump. Furthermore, the relay may be controlled by a flow switch to automatically control the fluid injection. Alternatively, the relay may be controlled by a programmable central processing unit whereby the amount of fluid injected and the timing of the injections can be preprogrammed.

Thus, it is an object of the inventions to provide apparatuses and methods for an injection pump device where the pump is operated by a the current provided by a battery and where the battery can be charged using solar panels for converting solar energy into electrical energy. No external source of electrical power is required.

BRIEF DESCRIPTION OF THE DRAWING

The accompanying drawings are incorporated into and form a part of the specification to illustrate several examples of the present inventions. These drawings together with the description serve to explain the principles of the inventions. The drawings are only for illustrating preferred and alternative examples of how the inventions can be made and used and are not to be construed as limiting the inventions to the illustrated and described examples. The various advantages and features of the present inventions will be apparent from a consideration of the drawings in which.

DETAILED DESCRIPTION OF PREFERRED EMBODIMENTS

Figure 1:
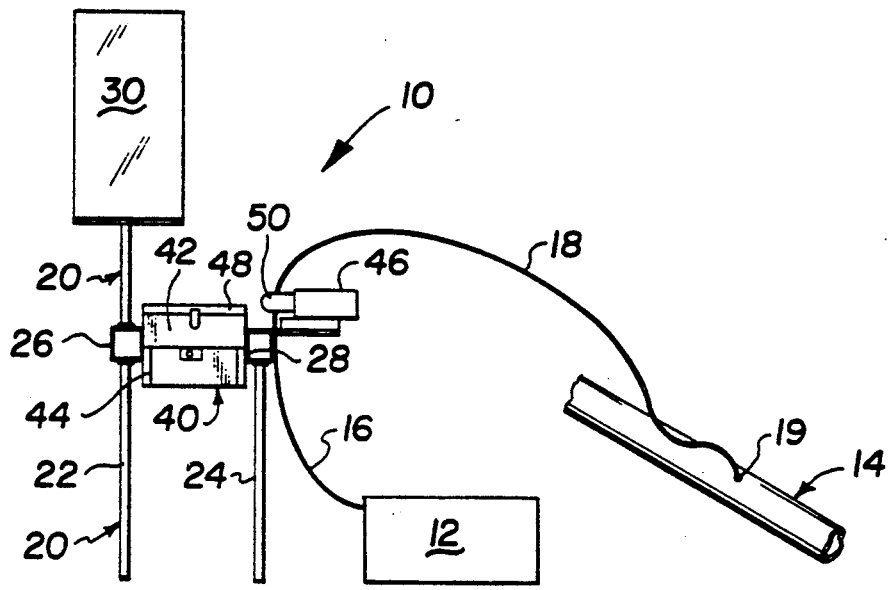
FIG. 1 is a diagram of one embodiment of an injection device for injecting fluids or chemicals into a pipeline, in which the injection device is shown in fluid communication with a fluid reservoir and a pipeline segment.

The present inventions will be described by referring to apparatuses and methods showing various examples of how the inventions can be made and used. In these drawings reference characters are used throughout the several views to indicate like or corresponding parts.

Referring now to the FIG. 1 of the drawing, a self-contained injection device, generally referred to by the numeral 10, is shown in fluid communication with a chemical storage reservoir 12 and a pipeline system 14. Reservoir 12 may comprise any suitable drum or field tank. The chemical to be contained in the reservoir 12 can be, for example, a corrosion inhibitor for pipeline system 14.

The injection device 10 is connected to the reservoir 12 through line 16, which preferably includes one or more lengths of tubing and appropriate plumbing fittings. The injection device 10 is also connected to the pipe system 14 through line 18, which preferably includes one or more lengths of tubing, appropriate plumbing fittings, and injection nozzle 19. The tubing fittings of lines 16 and 18 can be formed of any suitable material that is inert to the chemical or chemicals to be pumped through the lines. For example, the tubing can be flexible plastic tubing or rigid pipe sections and fittings formed of polyvinylchloride (PVC), fiberglass, or other composite material. The tubing and fittings of lines 16 and 18 can be clamped together or bonded with a suitable adhesive.

Figure 2:
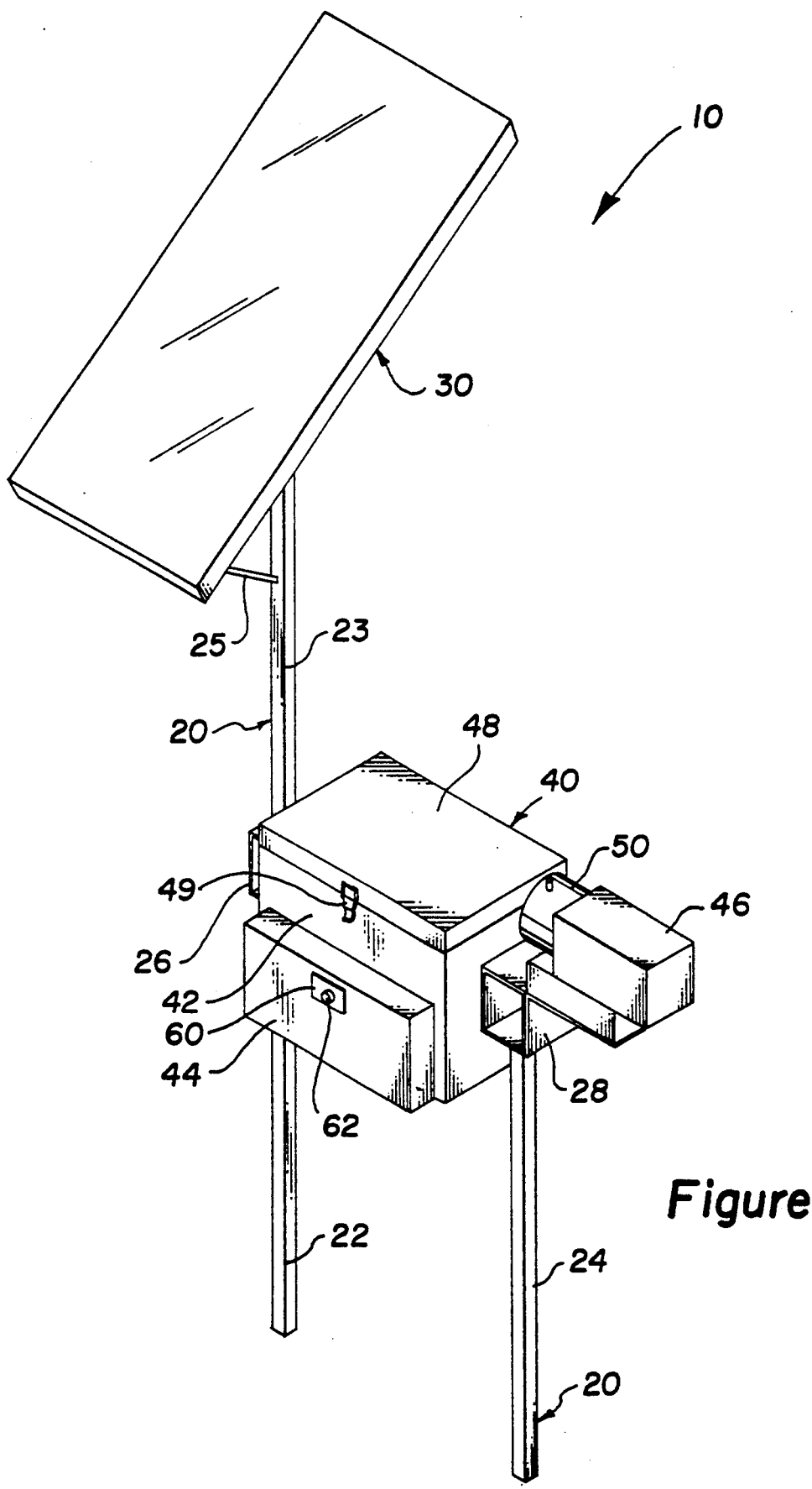
FIG. 2 is a perspective view of the solar powered injection device shown in FIG. 1.

As best shown in FIG. 2 of the drawing, the injection device 10 includes a support structure 20, a solar panel 30, a protective container structure 40 (which covers a voltage regulator, an electrical storage battery, and a selectively operable relay), and an electrically operated fluid pump 50.

As shown in FIGS. 1 and 2, container 40 has a large section 42 for containing the battery, a smaller section 44 mounted on a side of the section 44 for protecting the voltage regulator and selectively operable relay, and another section 46 for protecting the electrical components of pump 50. The battery section 42 has a lid 48 pivotally connected by hinges (not shown) along one side of the lid 48 to the rest of section 42. Lid 48 provides easy access to the battery and battery connections for assembly and periodic maintenance. A latch 49 is provided to retain the lid 48 in a closed position. The latch 49 can also be provided with a locking mechanism or can be padlocked.

Support structure 20 for supporting container 40 includes a pair of legs 22 and 24. Container 40 also serves as a structural cross-brace between legs 22 and 24 for support structure 20. As shown in FIG. 2, legs 22 and 24 are bolted or otherwise connected to the sides of container 40 at brackets 26 and 28, respectively.

Support structure 20 also includes an upwardly extending leg 23 for supporting the solar panel 30. Leg 23 is bolted or otherwise connected to the upper end of bracket 26. At the upper end, leg 23 is bolted or otherwise connected to a support plate that is secured to the back of the solar panel 30. A cross-brace 25 provides additional structural support to the solar panel 30 so that it can withstand strong winds. The cross-brace 25 can be adjustable so that the angular position of the solar panel 30 can be adjusted to maximize its exposure to solar energy.

Legs 22, 23, and 24 of the support structure 20 can be square, as shown in FIGS. 1 and 2, or more preferably, can be tubular for added strength. Legs 22, 23, and 24 are preferably hollow so that they may form a protective conduit for electrical wiring and connectors.

Solar panel 30 comprises a plurality of solar electric cells that are formed into an array for collecting solar energy and converting the solar energy to electrical current energy. The array of solar electric cells are electrically connected to leads of the solar panel 30. Solar panels are well known to those skilled in the art. Suitable solar panels for practicing the present inventions are commercially available, for example, from Photocomm, Inc., Scottsdale, Ariz. It is contemplated that advances in solar panel technology will be possible to incorporate within the injection devices and methods of the present inventions.

The solar panel 30 is used to generate direct current electricity to charge and recharge the battery as will hereinafter be described in detail. The preferred size of the solar panel 30 depends largely on the location. The geographical latitude and longitude of a region determines the typical amount of daylight. For example, in Arizona or New Mexico, a single solar panel having dimensions of approximately 44 inches by 20 inches can produce a 64 watt output at 3.7 amps and 17 volts, which is sufficient to charge a typical 12-volt deep cycle or marine battery that can operate a small injection pump 50 as hereinafter described in detail. On the other hand, in a region that has less daylight (which reduces the availability of solar energy) such as in Casper, Wyo., would require about four of such solar panels to provide sufficient energy to operate the same pump 50. Similarly, in regions such as Wyoming where the temperatures are often very low, the efficiency of a typical battery is substantially reduced and about six of such batteries would be required. Thus, though the inventions described herein can be practiced virtually anywhere, they are most advantageously employed in regions where solar energy is plentiful. The injection devices are preferably designed with the aid of computer software that contains TMY (Typical Meteorological Year) data for the particular geographical location where the device is intended to be used.

Figure 3:
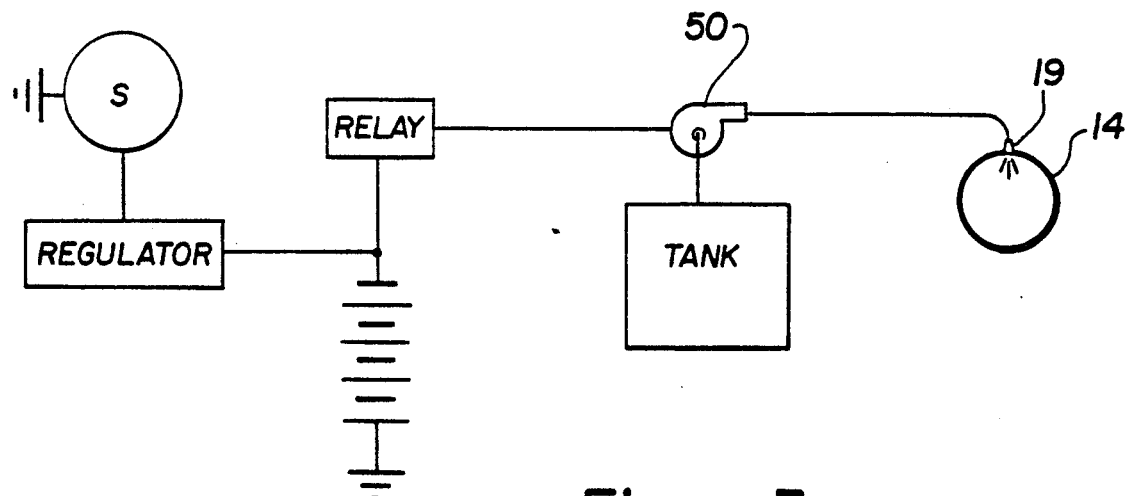
FIG. 3 is a schematic diagram of the inventions.

Referring now to FIG. 3 of the drawing, a schematic illustrates the electrical components of the injection device.

The electrical leads of the solar panel 30 (referred to by the letter "S" in FIG. 3) are connected to a voltage regulator. The regulator is a photovoltaic battery charge regulator connected to one lead of a battery for charging or recharging an electrical storage battery from the direct current generated by solar panel 30. Preferably the battery is a typical 12-volt deep cycle or marine battery rated at 80 amp hours. As shown in the drawing, the other lead of the battery is connected to battery negative. In the preferred embodiment, the voltage regulator is a 12-volt shunt regulator that is commercially available from Specialty Concepts, Inc., Canoga Park, Calif.

When in the charging mode, the voltage regulator allows maximum available current from the solar panel 30 to flow into the battery through a blocking diode, which lights a "charging" light of the regulator while the other lead of the solar panel 30 is connected to battery negative. As the battery charges, its voltage will rise slowly until it reaches the "charge termination" set-point of the voltage regulator. At this point, the regulator will connect the solar panel "plus" lead to solar panel "minus" lead, thus harmlessly shorting the cells of solar panel 30. When no power is produced by the shorted solar panel 30, the "charging" light goes out and no current flows to the battery. When the battery voltage drops to the "charge resumption" set-point, the regulator connects the solar panel 30 to the battery again and charging resumes as previously described.

The result is that when battery voltage is low, charging will be continuous. As the battery charges up, current will pass into the battery for a while and then shut off, cycling on for shorter periods and staying off longer. At full charge, the regulator will pulse current into the battery to achieve and maintain full charge. Whenever the battery is being charged, the "charging" light will be on. Thus, the pulse charging when the battery is at or near full charge will be reflected by a blinking "charging" light.

Referring back to FIG. 2 of the drawing, a simple control panel 60 is mounted on the front of the container 44. In a simple and preferred form of the invention, a simple "Hand-Off-Auto" control switch 62 is exposed to control the operation of the injection system 10. The switch 62 is connected to a selectively operable relay positioned inside container 44.

Referring again to FIG. 3, the input of the relay is electrically connected to the battery and the output of the relay is electrically connected to pump 50. The relay is controlled by switch 62. When the switch is placed in the "Hand" position, the system is manually controlled, meaning that the electrical connection between the battery and the pump 50 is continuously connected. When the switch 62 is positioned in the "Off" position, the electrical connection between the battery and the pump 50 is broken. When the switch 62 is positioned in the "Auto" position, the preselected, automatic settings of the relay control the electrical connection between the battery and the pump 50.

In the "Auto" position, a flow switch (freeze, flow/no flow), for example, can be used to control the pump operation. The relay is preferably connected to a flow switch that detects the flow of liquid or gas through the pipeline 14. When there is flow, the switch generates a signal that is sent to the relay and causes the relay to connect electrical current to the pump 50. When there is no flow, the switch stops generating the signal and the relay automatically cuts the electrical current to the pump 50. The flow switch can be of the mechanical paddle wheel type or, more preferably, of the ultrasonic type. Thus, the chemical is only injected into the pump when there is flow through the pipeline. When there is no flow through the pipeline, a corrosion inhibitor or other chemical normally does not need to be injected. This simple flow switch does not require much, if any, of the pipeline operators time for adjustments or maintenance and the injection device and be used to pump fluids into pipelines at remote or unattended locations.

Sometimes a more complex or response controller is desirable for certain pipeline applications. For example, a flow measuring device can be optionally included to generate an analog or digital signal in proportion to the flow rate through the pipeline 14. The relay can include a central processing unit for controlling the pump 50 in response to the flow rate through the pipeline 14. When the flow rate is high, the relay could cause the pump to operate continuously at its injection setting. When the flow signal decreases as the flow rate through the pipeline 14 decreases, the relay can operate the pump 50 at appropriate intervals to proportionally decrease the amount of chemical injected by the pump into the fluid throughput of the pipeline 14. Thus the chemical is used more efficiently and with less waste.

For the periodic treatment of oil well downhole tubulars, the relay can have a simple electrical circuit such as an interval timer for controlling the pump 50. The relay can alternatively include a more complex programmable logic controller to operate actuator equipped vales for automatically controlling the sequence of events for treating an oil well.

As shown in FIGS. 1 and 2 of the drawing, pump 50 is mounted to bracket 28. In a preferred embodiment of the inventions, the pump 50 is of the electronic solenoid type. As stated before, when electrical current is allowed to flow through the relay to the pump 50, the pump is operates to move fluid from the tank 12 to the pipeline 14. The injection pump is preferably selected for its small wattage requirement, such as a 12 volt direct current pump with a small total current demand. The pump can have an adjustable stroke frequency and adjustable stroke length for metering the amount of fluid injected into the pipeline 14. The pump preferably can operate at pressures of at least 300 pounds per square inch (PSI), which is equivalent to 20.7 bar. In a most preferred embodiment, the pump 50 should also be explosion proof. The pump should be able to pump acids, polymers, solvents, alkalines, boicides, corrosion inhibitors, or any number of chemical products. Such pumps are available, for example, from Liquid Metronics Division (LMI) of Milton Roy, Acton, Mass.

In an alternative embodiment, the current from the battery can be used to power an air compressor instead of a pump. The air compressor can produce compressed air, which is then used to power an air operated pump for injecting the chemicals.

In an alternative embodiment of the invention, an inverter can be used to convert low voltage direct current from the battery to a standard alternating current. Thus the inverter can be used to run an alternating current appliance such as an electrical pump from a battery power source. The inverter used in the preferred embodiment of the inventions is commercially available from Statpower Technologies Corp., Burnaby, British Columbia. With such an inverter, the low voltage, direct current battery power source can be used to operate an 115 volt alternating current pump or air compressor instead of a direct current appliance.

The injection device shown in the Figures of the drawing can be assembled using commercially available components. A preferred method according to the invention involves assembling the commercially available components to build the injection device 10 and connecting the suction inlet of the pump 50 to a chemical storage tank 12 and connecting the high pressure or injection outlet of the pump 50 to a pipeline. The preferred embodiments of the inventions provide a system for injecting a fluid chemical into a pipeline system. Thus, the embodiments of the present invention are intended to provide a low cost, low maintenance injection device and method that are intended to inject small but adequate amounts of corrosion inhibitor into pipelines that otherwise would never receive any internal corrosion preventative type maintenance.

The embodiments shown and described above are only exemplary. Many of the details can be found in the art. Therefore, such details are neither shown nor described. It is not claimed that all of the details, parts, elements, or steps described and shown were invented herein. Even though numerous characteristics and advantages of the present inventions have been set forth in the foregoing description, together with details of the structure and function of the inventions, the disclosure is illustrative only, and changes can be made in the detail, especially in matters of shape, size and arrangement of the parts within the principles of the inventions to the full extent indicated by the broad general meaning of the terms used the claims.

The restrictive description and drawings of the specific examples above do not point out what an infringement of this of this patent would be, but are to provide at least one explanation of how to make and use the inventions. The limits of the inventions and the bounds of the patent protection are measured by and defined in the claims.

Having described the invention, what is claimed is:

1. A fluid injection apparatus for injecting a metered amount of a fluid into a pipeline system, said apparatus comprising:
   (a) a support structure;
   (b) a solar panel supported by said support structure whereby said solar panel can be oriented toward the sky;
   (c) an electrical storage battery operatively connected to said solar panel; and
   (d) an electrically operated fluid pump operatively connected to said battery, said fluid pump having an adjustable stroke length and adjustable stroke frequency,
whereby the apparatus is independent of any external electrical power supply.

2. The apparatus of claim 1 wherein said battery is operatively connected to said solar panel through a voltage regulator.

3. The apparatus of claim 2 wherein said pump is operatively connected to said battery through a selectively operable relay.

4. The apparatus of claim 3 wherein said relay is controlled by a programmable central processing unit.

5. The apparatus of claim 3 wherein said relay is controlled by a selectively operable flow switch.

6. The apparatus of claim 3 wherein said regulator, said battery, and said relay are enclosed within a structure to protect these elements from the weather.

7. The apparatus of claim 1 wherein said pump is operatively connected to said battery through a selectively operable relay.

8. The apparatus of claim 7 wherein said relay is controlled by a programmable central processing unit.

9. The apparatus of claim 7 wherein said relay is controlled by a selectively operable flow switch.

10. The apparatus of claim 1 wherein said pump is operable with low voltage direct current directly from a battery.

11. The apparatus of claim 10 wherein said battery is a 12 volt battery and said pump is operable with 12 volt direct current.

12. The apparatus of claim 1 wherein said pump is operable by alternating current and the apparatus further comprises an inverter for converting the direct current from said battery to alternating current to operate said pump.

13. The apparatus of claim 1 wherein said pump has a suction line and an injection line, whereby said pump can be operatively connected to a fluid storage tank through said suction line and said pump can be operatively connected to inject a fluid from the tank into a pipeline.

14. A fluid injection apparatus for injecting a metered amount of fluid into a pipeline system, said apparatus comprising:
   (a) a support structure;
   (b) a solar panel supported by said support structure whereby said solar panel can be oriented toward the sky;
   (c) a receptacle for an electrical storage battery that can be operatively connected to said solar panel;
   (d) and electrically operated fluid pump that can be operatively connected to the battery, and
   (e) means for selectively controlling the stroke length and stroke frequency of said fluid pump,
whereby when provided with the battery, the apparatus is independent of any external electrical power supply.

15. The apparatus of claim 14 further comprising an electrical storage battery.

16. A method of injecting a metered amount of a fluid into a pipe comprising the steps of:
   (a) supporting a solar panel in the vicinity of the pipeline location for converting solar energy to electrical current;
   (b) electrically connecting the solar panel to an electrical storage battery through a voltage regulator that regulates the current generated by the solar panel to the battery for charging the battery;
   (c) electrically connecting an electrically operable metering fluid pump to the battery through a selectively operable relay that controls electrical current from the battery;
   (d) fluidly connecting a fluid inlet of the pump to a reservoir of a fluid and fluidly connecting a fluid outlet of the pump to a pipe;
   (e) selectively controlling the relay to operate the pump; and
   (f) selectively controlling the stroke length and stroke frequency of the pump, thereby metering fluid from the reservoir into the pipe.

17. The method of claim 16 wherein the relay is controlled by a programmable central processing unit whereby the amount of fluid injected into the pipe and the timing of injections may be preselected.

18. The method of claim 16 wherein the relay is controlled by a flow switch that sends a signal to the relay to operate the pump when there is flow through the pipe.

19. The method of claim 16 wherein the relay is controlled by a flow measuring device that sends a signal that is proportional to the flow of fluid through the pipe and wherein the relay has a controller that selectively operates the pump in proportion to the flow through the pipe.

20. The method of claim 16 wherein the pipeline is a pipeline for conveying petroleum products.

21. The method of claim 20 wherein the fluid is a chemical corrosion inhibitor.

22. The method of claim 16 wherein at least the regulator, battery, and relay are positioned within a protective structure.

23. A fluid injection apparatus for injecting a metered amount of a fluid into a pipeline system, the apparatus comprising: a solar panel for converting solar energy into electrical energy; an electrical storage battery operatively connected to said solar panel; a fluid pump having an adjustable stroke frequency; and a selectively operable relay for selectively connecting said pump to said battery, whereby said battery can be used to power said pump to inject a metered amount of a fluid into a pipeline system.

24. A fluid injection apparatus for injecting a metered amount of a fluid into a pipeline system, the apparatus comprising: a solar panel for converting solar energy into electrical energy; an electrical storage battery operatively connected to said solar panel; a fluid pump having an adjustable stroke length; and a selectively operable relay for selectively connecting said pump to said battery, whereby said battery can be used to power said pump to inject a metered amount of a fluid into a pipeline system.

25. A fluid injection apparatus according to claim 24, wherein said pump has an adjustable stroke frequency for further controlling the metered amount of fluid injected into the pipeline system.

26. A fluid injection apparatus according to claim 24, wherein said selectively operable relay comprises: a flow measuring device that generates a signal in proportion to the flow through the pipeline system; and a central processing unit for selectively connecting said pump to said battery at appropriate intervals in response to the flow signal, whereby a metered amount of the fluid is injected in proportion to the flow through the pipeline system.

27. A method of injecting a metered amount of a chemical treatment fluid into a oil field pipeline, the method comprising the steps of:
supporting a solar panel in the vicinity of the pipeline location for converting solar energy to electrical current;
electrically connecting the solar panel to an electrical storage battery through a voltage regulator;
electrically connecting a selectively operable relay to selectively drive a metering fluid pump with the electrical energy stored in the battery;
fluidly connecting a fluid inlet of the pump to a reservoir of a chemical treatment fluid and fluidly connecting a fluid outlet of the pump to the pipeline; and
adjusting a means for selectively controlling the amount of fluid injected by the pump, whereby a chemical fluid from the reservoir can be metered into the pipeline.

28. The method of claim 27, wherein the means for selectively controlling the amount of fluid injected by the pump comprises an adjustable stroke frequency on the pump.

29. The method of claim 27, wherein the means for selectively controlling the amount of fluid injected by the pump comprises an adjustable stroke length on the pump.

* * * * *

UNITED STATES PATENT AND TRADEMARK OFFICE
CERTIFICATE OF CORRECTION

PATENT NO. : 5,293,892

DATED : March 15, 1994

INVENTOR(S) : George E. Fourqurean

It is certified that error appears in the above-indentified patent and that said Letters Patent is hereby corrected as shown below:

Column 5, line 59 change "response" to -- responsive --.

Signed and Sealed this

Twenty-seventh Day of September, 1994

Attest:

BRUCE LEHMAN

*Attesting Officer*     *Commissioner of Patents and Trademarks*